Oct. 22, 1940.  W. J. BAIRD  2,218,804

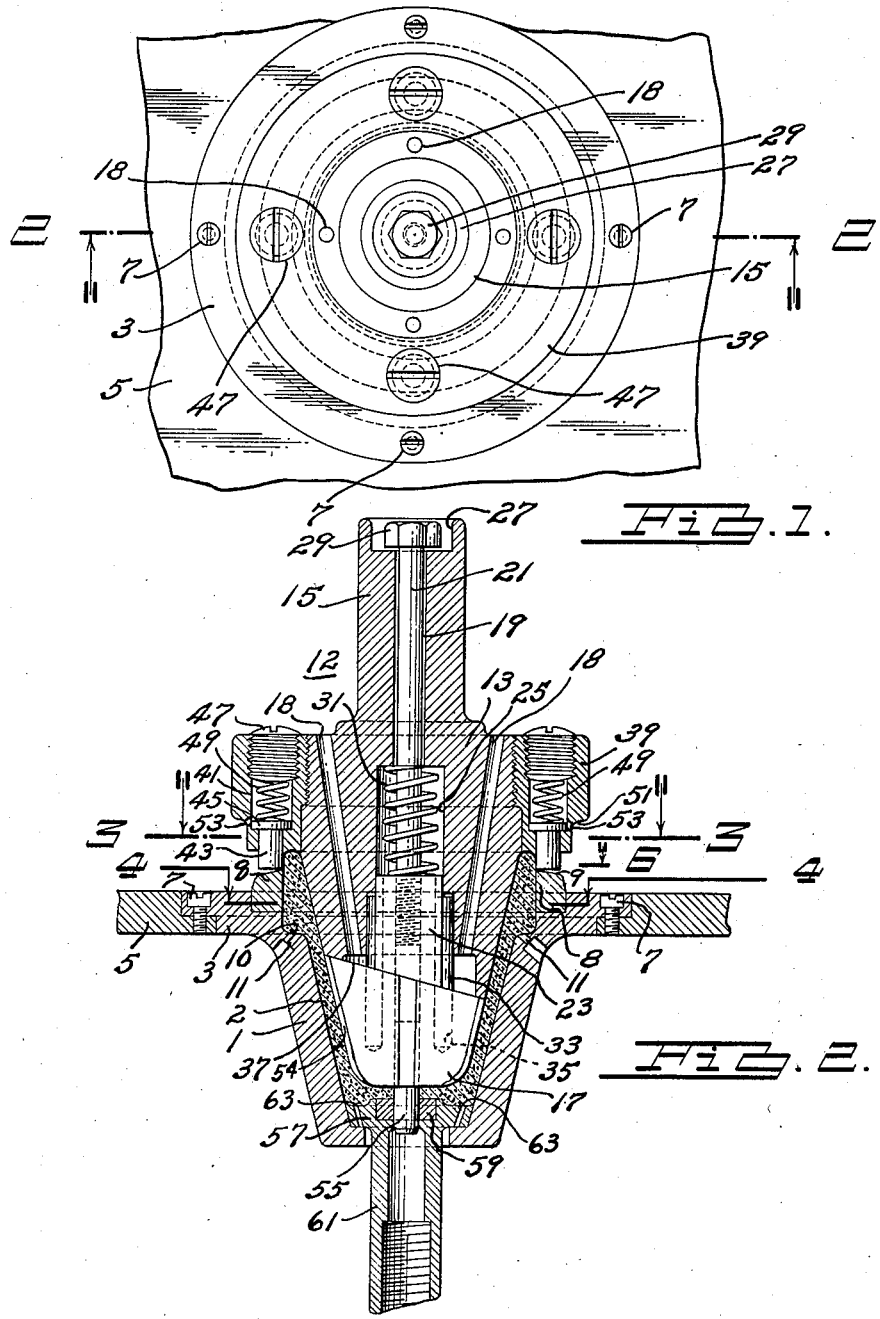

PLASTIC FORMING APPARATUS

Original Filed Aug. 23, 1937   2 Sheets-Sheet 2

INVENTOR.
William J. Baird
BY
ATTORNEY.

Patented Oct. 22, 1940

2,218,804

UNITED STATES PATENT OFFICE 2,218,804

PLASTIC FORMING APPARATUS

William J. Baird, Birmingham, Mich.

Application August 23, 1937, Serial No. 160,375
Renewed June 14, 1940

6 Claims. (Cl. 25—26)

My invention pertains to molding machinery and more particularly to formers for use in automatic or semi-automatic machines for shaping articles from plastic material for the manufacture of pottery and the like.

Previously known forming apparatus for shaping articles and ware from plastic material failed to produce ware which was sufficiently free from flash and joint marks on the plastic material. Consequently such blemishes had to be removed from the articles either before or after baking, and this necessitated an additional operation which was difficult and required particular care to avoid injury to the article.

It is accordingly an object of my invention to provide improved plastic forming means for shaping articles from plastic material to produce articles or ware all surfaces of which will be free from joint marks and flashes of the material which must be worked over.

It is also an object of my invention to provide a plastic former comprising a mold defining the outer conformation of ware to be formed of plastic material, a rotatable spinner adapted to be moved axially for insertion into and withdrawal from the mold to form the inside of the ware, a slidable nose on the inserted end of the spinner movable against the spinner body to define a continuous peripheral surface as it is inserted into plastic material in the mold and movable away from the body to separate the formed ware from the spinner as the spinner is removed from the mold, and the adjacent portions of the body and the nose being formed so as to meet along a non-circular peripheral line of division for preventing the joint line in the plastic material as the spinner rotates.

It is a further object of my invention to provide such a former having a trimming ring which is adjustably secured around the upper end of the spinner and which is provided with substantially cylindrical trimmer pins which are spring pressed toward a wear ring, on the upper edge of the mold, the inner edge of the wear ring being raised to rotate the pins as they pass over it for effectively wiping off the flash around the upper edge of the ware.

Further objects and advantages are within the scope of my invention such as relate to the arrangement and function of the related elements, to various details of construction and combinations of parts, elements per se, and numerous other advantages as will be apparent from a consideration of the specification in conjunction with the drawings disclosing an embodiment of my invention, in which:

Fig. 1 is a plan view of my improved plastic former;

Fig. 2 is a sectional view on line 2—2 thereof;

Figure 3:
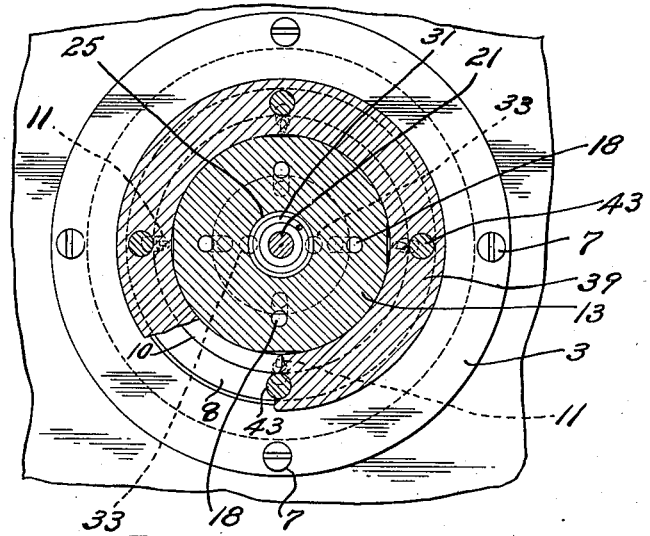
Figure 5:
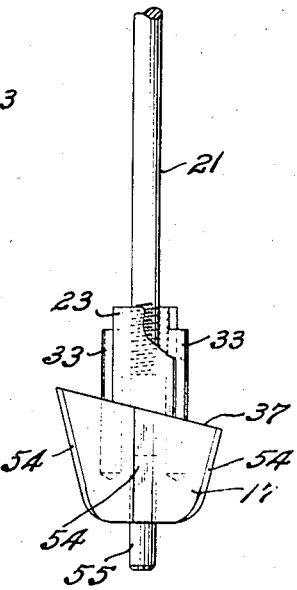
Figure 4:
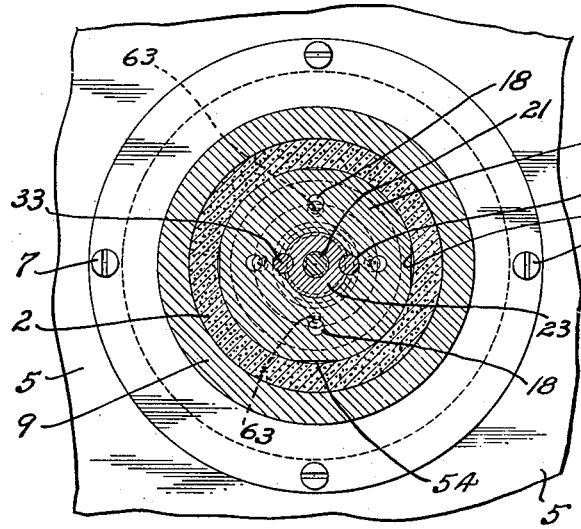
Figure 6:
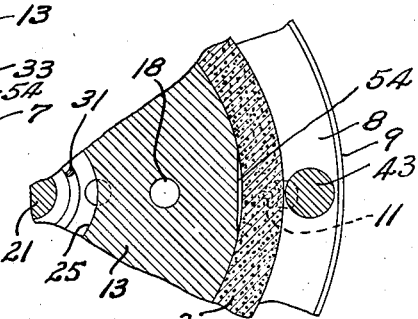
Figure 7:
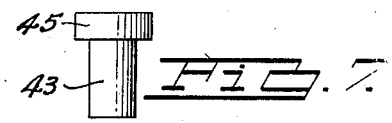

Figs. 3 and 4 are sectional views on lines 3—3, and 4—4 thereof;

Fig. 5 is a side elevational view of the nose of the spinner removed from the spinner and partly broken away to show the keys therein;

Fig. 6 is an enlarged fragmentary sectional view taken on line 6—6 to the center of Fig. 2; and Fig. 7 is an enlarged elevational view showing one of the trimmer pins.

Referring more specifically to the figures of the drawings my improved plastic material former comprises a stationary mold or die 1 of an internal shape corresponding to the outer conformation of an article to be formed of plastic material 2.

The internal shape of the mold 1 may be suitably selected for forming various articles, vessels, dishes or ware, and the particular embodiment illustratively disclosed is of frusto-conical shape particularly adapted to form flower pots. The mold is perfectly made of cast iron, or an alloy of nickel and cast iron, although other suitable materials may be utilized. For mounting and supporting the mold it has a flange 3 projecting laterally around its upper edge for seating into a suitable aperture forming a socket as shown in a supporting plate 5, which may be a part of any automatic or semi-automatic machine, where it is secured stationary by means of screws 7, or in any other suitable manner.

A wear ring 8, which is preferably of wear resistant material, is secured in and around the upper open edge of the mold 1, as by pressing it into a suitable stepped groove provided therein. As shown in Fig. 2, the upper surface or face 9 of the wear ring 8 is bevelled or tapered having its inner portion raised with reference to its outer portion, for a purpose to be subsequently described. The mold 1 comprises in its inner wall an abruptly expanded groove 10 for forming shoulders on the flower pots and vents 11 are provided to facilitate packing the plastic material firmly therein.

For forming and spinning the plastic material 2 in the mold a spinner 12 is provided which is of a conformation substantially corresponding to the inside of the mold 1. The spinner comprises a spinner body 13 having an elongated shank 15 extending from the upper end for securement into the chuck of any suitable pottery machine (not shown) by which it is rotatable and also movable axially for insertion into and withdrawal from the mold to form the inside of the article in a well known manner.

Carried by the lower end of the spinner body I provide a relatively movable member or nose 17 which moves into engagement with the body 13 to make a substantially contiguous peripheral surface therewith as the rotating spinner is plunged into the mold. As the spinner is withdrawn, the nose 17 moves away from the body to separate the formed article or ware therefrom. Vents 18 are provided extending through the body of the spinner to ventilate the space between the spinner body and the movable nose 17.

For securing the nose 17 and limiting its movement relative to the spinner body 13, the latter is provided with an aperture or bore 19 extending axially therein. A bolt or rod 21 of smaller diameter than the bore 19 slides freely therein and is secured at its inner end in a suitable threaded aperture provided in neck 23 which projects from the nose and which slides freely in an enlarged counter-bore 25 in the spinner body. At the outer end of the bolt aperture 19 an enlarged counter-bore 27 is provided to receive the head 29 of the bolt. The length of the bolt and its threaded engagement in the neck 23 is suitably arranged to provide slack motion for the desired movement of the nose 17 away from the body 13 in accordance with the conditions of operation.

Although it is not always necessary, it is frequently desirable to provide a helical compression spring 31 concentrically on the bolt 21 in the enlarged counter-bore 25 in the spinner body where it functions to push the nose away from the spinner body and to separate the formed article from the spinner.

To resist the tendency of the spinner nose 17 to rotate relative to the spinner body as it is plunged into the plastic material, I provide in my improved spinner one or more round key pins 33 which are driven snugly into holes 35 drilled into the nose at the base of the neck from which they extend for sliding freely in guide apertures 35 in the side walls of the enlarged counter-bore 25. The apertures for the key pins 33 are provided by inserting the neck 23 of the spinner nose 17 into the counter-bore 25 in the spinner body and drilling in from the end of the nose. As shown more clearly in Figs. 4 and 5, the apertures are drilled about half in the neck 17 of the nose and half in the side wall of the enlarged counter-bore 25. After drilling the apertures in the nose piece the outer ends of the apertures are then closed in any suitable manner. The ends of the key pins 33 projecting from the nose 17 are reduced sufficiently to provide for free slidable movement in the guide grooves thus provided in the side walls of the enlarged counter-bore 25. If preferred, keys of rectangular cross-section may be utilized by cutting suitable keyways in the side of the neck 23 and in the adjacent portion of the spinner body as will be understood. The spinner body and nose are preferably of cast iron or an alloy of cast iron and nickel, although any suitable material may be used.

In accordance with another feature of my improved spinner I provide for preventing the formation of a joint line in the plastic material between the spinner body and the slidable nose piece carried thereby. This I accomplish by eliminating the cause of joint marks by so forming the adjacent abutting portions of the body and the nose that they meet along a line of division which is defined by a plane intersecting the spinner at an acute angle to the axis thereof, as shown in Figs. 2 and 5. Hence, the dividing line 37 of the two relatively movable parts is not true radially but is on an angle with the center line of the spinner. This angle is not critical but I have found that an angle of from 85 to 87 degrees is quite satisfactory. Also, although the spinner is circular in cross section, the peripheral dividing line 37 between the two parts is non-circular. As the spinner rotates in the plastic material, the non-circular peripheral line of division, thus formed, eliminates or prevents the joint mark, or line, in the formed article. This is accomplished because of the action of the non-circular joint line in trowelling the plastic material as the spinner rotates. In accordance with this feature of my invention it is also convenient to provide a plurality of relatively movable sections in abutting relation with non-circular joints between them.

For trimming off or wiping away the flash or surplus material forced out over the top of the mold, I provide a trimmer ring 39 which is internally threaded for adjustable mounting on the upper end of the spinner body 13 which is externally threaded to receive the ring. A trimmer pin socket 41 is drilled in the trimming ring passing therethrough substantially parallel to the center line or axis of rotation of the spinner. The upper portion of the socket 41 comprises an enlarged counter-bore which at its lower end provides a shoulder to limit the downward movement of a trimmer pin 43 which is projected through the lower portion of the socket and which has a wide lateral head 45 for abutting on the shoulder.

The trimmer pin 43 is of wear resistant material, such as hard tempered steel, and it is of circular cross-section of a suitable size to permit rotation in the socket. The downwardly projected end of the trimmer pin is flat for wiping around on the raised portion of the face of the wear ring 8. The upper end of the trimmer pin socket is internally threaded to receive a threaded screw 47 for adjustably compressing a helical spring 49 upon the head of the trimmer pin.

An annular groove 51 is cut in the outermost lower corner of the trimmer ring 39 of a suitable depth to open apertures 53 from the innermost end of each large counter-bore in the socket 41 opening adjacent the head of the trimmer pin. The apertures 53 comprise vents through which small particles of the clay are discharged after working up around the trimmer pin. If preferred the groove may be cut slightly shallower and the vents may be formed by drilling into the large counter-bore of the trimmer pin socket, as will be understood. Although, under some conditions, a single trimmer pin 43 is sufficient to wipe or trim away the flash or surplus of extruded material around the upper rim of the ware, a plurality of similar sockets and pins may be provided, as shown.

As the spinner rotates the spring 49 resiliently presses the trimmer pin 43 down on the wear ring 8 which causes the pin to rotate in its socket and to effectively wipe or trim away the surplus of plastic material or flash from the upper rim of the ware. The round trimmer pins 43 are safe and do not constitute a hazard to the operator.

On the outer surface of my spinner I provide flattened areas 54 in the form of elongated strips which extend down over the spinner body and nose. One or more of these flat bands may be provided and they serve to work or trowel the plastic material as the spinner rotates, and also assist the non-circular joint line in eliminating the joint mark.

The embodiment of my invention disclosed is especially adapted for forming flower pots which have to be perforated for drainage.

For this purpose a hardened punch 55 is provided on the spinner nose 17 for piercing through the material and forcing it through an aperture in a bottom plate 57 which sets in the open bottom of the mold 1. An insert 59 is provided in the bottom plate 57 surrounding the aperture therein. A tubular stem 61 extends from the bottom plate through the open bottom of the mold for operation automatically or otherwise to eject the formed ware from the mold. The material punched out of the bottom of the flower pot passes down the hollow stem 61. Vents 63 are provided in the bottom plate to allow air and surplus material to escape while the material is being pressed in the mold.

It will be seen that I have provided an improved former comprising means for shaping articles of plastic material to produce articles or ware which is free from joint marks and flashes on all surfaces thereof.

It is apparent that within the scope of my invention, modifications and different arrangements may be made other than herein disclosed, and the present disclosure is illustrative merely, the invention comprehending all variations thereof.

I claim:

1. In combination in a plastic former, a mold of frusto-conical shape defining the outer conformation of a flower pot to be formed of plastic material, a rotatable spinner of a shape substantially corresponding to said mold and movable axially for insertion into and withdrawal from said mold to form the inside of the article, said spinner comprising a body, a nose on the end of said body for insertion into the mold, means for slidably supporting said nose on said body for movement toward the body to define a contiguous peripheral surface as the spinner is moved into the mold and movable away from the body to separate the formed article as the spinner is removed from the mold, and the adjacent portions of said body and nose being formed for meeting along a section plane passing at an acute angle to the axis of rotation for eliminating or preventing the joint line in the plastic material by trowelling the material as the spinner rotates.

2. In combination in a plastic former, a mold defining the outer conformation of ware to be formed of plastic material, a rotatable spinner movable axially for insertion into and withdrawal from said mold to form the inside of the ware, a relatively movable nose on said spinner for engagement thereon to form a substantially continuous outer surface therewith as the spinner is inserted into plastic material in said mold and movable to separate the ware therefrom as the spinner is withdrawn, said spinner and said movable nose being disposed relatively for preventing the joint line in the plastic material as the spinner rotates, an adjustable trimming ring encircling the end of the spinner remote from the nose, a trimmer pin socket disposed in said ring substantially parallel to the axis of rotation of the spinner, a substantially cylindrical trimmer pin slidably disposed in said socket, a wear ring secured in and around the upper edge of said mold, the inner portion of the exposed surface of said wear ring being bevelled or raised toward said trimming ring, and means for resiliently projecting one end of said pin to wipe around on the raised portion of said wear ring and so positioned that the pin is caused to rotate as it is carried around on said wear ring by the rotation of said spinner and the surplus of material is cleaned from the rim of the ware.

3. In combination in a plastic former, a mold defining the outer conformation of ware to be formed of plastic material, a rotatable spinner movable axially for insertion into and withdrawal from said mold to form the inside of the ware, a trimming ring encircling the end of the spinner remote from the mold, a wear ring of wear resistant material secured in and around the upper edge of said mold, a substantially cylindrical pin slidably disposed in said trimming ring for projection toward said wear ring, a spring for resiliently projecting said trimming pin to engage said wear ring as the spinner enters said mold, and a portion of the exposed surface of said wear ring innermost toward the axis of the spinner being raised toward the trimming pin to engage the end thereof substantially inwardly of its center of rotation.

4. A spinner for rotatable insertion into a mold for shaping plastic material to form smoothly finished ware comprising, a body of substantially circular cross-section, a shank extending from one end of said body, a nose on the other end of said body, means for slidably supporting said nose on said body for movement toward the body to define a contiguous peripheral surface therewith and for movement away from the body to separate formed ware therefrom, the adjacent portions of said body and nose being formed to meet along a plane at an acute angle to the axis of rotation, a trimming ring adjustably secured around the end of the body adjacent said shank, a trimmer pin socket in said ring, a flat ended trimmer pin of substantially circular cross section rotatably disposed in said socket for projection substantially parallel to the axis of rotation of said body, a spring for resiliently projecting a flat end of the rotatable pin from the socket substantially toward the end of said body remote from the shank, and means limiting the extended projection of said pin from said socket.

5. A plastic former comprising the combination set forth in claim 3 wherein, said trimming ring has a socket aperture extending through substantially parallel to the axis of rotation of the spinner with a limiting shoulder in the lower end of the socket aperture, and the substantially cylindrical pin is substantially flat on the projected end and has a laterally projecting head on the inner end for abutting on the shoulder of the socket for limiting the projection of the pin from the socket.

6. A spinner for rotatably insertion into a mold for shaping plastic material to form smoothly finished ware comprising, a spinner body having circular cross sections, a shank on one end of said body for supporting the body for rotation on an axis coinciding with the centers of said circular sections, a nose portion, means carrying said nose portion relatively movably on the end of said body remote from the shank, said nose portion being of a conformation having circular cross sections with centers substantially coinciding with the axis of rotation of said body and having a peripheral surface adapted to define a smooth contiguous surface with the surface of said body when moved adjacent thereto, and the adjacent engaging parts of said body and said nose portion being so formed that the meeting joint line between the surfaces is substantially in a plane disposed at an acute angle to the axis of rotation of the spinner body to engage plastic material with a wobbling trowelling action for eliminating or preventing a joint line in the material.

WILLIAM J. BAIRD.